US010104230B2

(12) United States Patent
Kumar et al.

(10) Patent No.: US 10,104,230 B2
(45) Date of Patent: Oct. 16, 2018

(54) SYSTEMS AND METHODS FOR AVAILING MULTIPLE INPUT CHANNELS IN A VOICE APPLICATION

(75) Inventors: Arun Kumar, Noida (IN); Sheetal K. Agarwal, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 13/035,033

(22) Filed: Feb. 25, 2011

(65) Prior Publication Data
US 2012/0219135 A1 Aug. 30, 2012

(51) Int. Cl.
*H04M 1/64* (2006.01)
*H04M 3/493* (2006.01)
(Continued)

(52) U.S. Cl.
CPC .... *H04M 3/4936* (2013.01); *H04M 2203/252* (2013.01)

(58) Field of Classification Search
CPC ......... H04W 4/12; H04W 4/003; H04W 4/18; H04W 8/183; H04W 4/14; H04W 72/042; H04W 76/02; H04W 76/027; H04W 84/12; H04W 88/02; H04L 65/1016; H04L 67/02; H04L 12/5895; H04L 65/1046; H04L 67/10; H04L 67/22; H04L 12/587; H04L 51/046; H04L 69/08; H04L 1/1867; H04L 41/5051; H04L 61/1529; H04L 61/1588; H04L 63/10; H04M 3/4938; H04M 3/563; H04M 7/0024; H04M 11/066; H04M 1/2535; H04M 1/72519; H04M 1/72522; H04M 3/5191
(Continued)

(56) References Cited

U.S. PATENT DOCUMENTS 6,240,448 B1 * 5/2001 Imielinski ......... G06F 17/30899
379/90.01
6,901,431 B1 * 5/2005 Dodrill ................... H04L 29/06
379/88.17
(Continued)

FOREIGN PATENT DOCUMENTS

CN 101340491 1/2009
KR 20030011459 2/2003

OTHER PUBLICATIONS

Mitchell, Stella, et al., Multimodal Natural Language Platform Supporting Cellular Phones, Mobile Computing and Communications Review, 2006, pp. 34-45. vol. 10, No. 3, ACM Sigmobile, New York, New York.
(Continued)

*Primary Examiner* — Ahmad F Matar
*Assistant Examiner* — Kharye Pope
(74) *Attorney, Agent, or Firm* — Ference & Associates LLC (57) ABSTRACT

Methods and arrangements for according multiple input media to a voice-based application. A voice application is accessed and a voice application template which supports a voice input mode is selected. At least one voice application template which supports at least one input mode other than voice and telephone touch tone is also selected, and a capability is accorded to selectively access the voice application via the voice input mode and the at least one input mode other than voice and telephone touch tone.

20 Claims, 3 Drawing Sheets

(51) Int. Cl.
*G06F 15/16* (2006.01)
*G10L 21/00* (2013.01)

(58) Field of Classification Search
USPC ....... 370/315, 352, 353, 354, 355, 356, 357;
709/217, 224; 455/466, 420, 412.1, 556,
455/414; 379/201.02
See application file for complete search history.

(56) References Cited

U.S. PATENT DOCUMENTS

| | | | | |
|---|---|---|---|---|
| 6,985,865 | B1* | 1/2006 | Packingham | G10L 15/22 704/270.1 |
| 7,016,848 | B2 | 3/2006 | St John Brittan et al. | |
| 7,231,020 | B2* | 6/2007 | Rhie | H04M 1/2478 379/88.14 |
| 7,283,973 | B1* | 10/2007 | Loghmani | G06Q 30/00 379/67.1 |
| 7,308,484 | B1* | 12/2007 | Dodrill | H04M 1/72561 704/223 |
| 7,778,630 | B2* | 8/2010 | Ho | H04W 36/0066 370/352 |
| 8,396,195 | B2* | 3/2013 | Malik | H04M 3/493 379/88.05 |
| 2002/0002462 | A1* | 1/2002 | Tetsumoto | 704/270.1 |
| 2002/0062216 | A1* | 5/2002 | Guenther | G06F 3/167 704/270.1 |
| 2002/0099553 | A1* | 7/2002 | Brittan | G10L 13/08 704/270.1 |
| 2003/0009339 | A1* | 1/2003 | Yuen | H04M 3/4938 704/260 |
| 2003/0171925 | A1 | 9/2003 | Werner | |
| 2003/0174155 | A1* | 9/2003 | Weng | H04M 3/4931 715/700 |
| 2004/0172254 | A1* | 9/2004 | Sharma | A61K 8/411 704/270.1 |
| 2005/0055403 | A1* | 3/2005 | Brittan | H04L 29/06 709/206 |
| 2005/0234727 | A1* | 10/2005 | Chiu | H04M 3/4936 704/270.1 |
| 2005/0278179 | A1* | 12/2005 | Overend | G10L 15/30 704/270.1 |
| 2007/0047719 | A1* | 3/2007 | Dhawan | H04M 1/2478 379/235 |
| 2007/0055938 | A1* | 3/2007 | Herring et al. | 715/729 |
| 2007/0136072 | A1* | 6/2007 | Sampath | G10L 15/30 704/275 |
| 2008/0065390 | A1 | 3/2008 | Ativanichayaphong et al. | |
| 2008/0147406 | A1 | 6/2008 | Da Palma et al. | |
| 2009/0100024 | A1* | 4/2009 | Manesh | H04L 67/02 |
| 2012/0023190 | A1* | 1/2012 | Backholm et al. | 709/217 |
| 2012/0093054 | A1* | 4/2012 | Liu et al. | 370/312 |

OTHER PUBLICATIONS

Nardelli, Luca, et al., "A Multi-Modal Architecture for Cellular Phones", Oct. 13-15, 2004, pp. 323-324, ICMI '04: Sixth International Conference on Multimodal Interfaces, State College, Pennsylvania.

Yin, Min, and Zhai, Shumin, "Dial and See—Tackling the Voice Menu Navigation Problem with Cross-Device User Experience Integration", Oct. 23-27, 2005. pp. 187-190, UIST'05, Proceedings of the 18th annual ACM symposium on User interface software and technology, ACM, New York, New York.

Trabelsi, Zouheir, et al "A Voice and Ink XML Multimodal Architecture for Mobile e-Commerce Systems", Sep. 28, 2002, pp. 100-104, WMC '02 Proceedings of the 2nd international workshop on Mobile commerce, ACM, New York, New York.

Kumar, A, et al., "The spoken web application framework: user generated content and service creation through low-end mobiles", Proceedings of the 2010 International Cross Disciplinary Conference on Web Accessibility, Apr. 26-27, 2010, 10 pages, ACM, New York, New York, USA.

* cited by examiner

SYSTEMS AND METHODS FOR AVAILING MULTIPLE INPUT CHANNELS IN A VOICE APPLICATION

BACKGROUND

The lack of internet access in many parts of the world, especially in developing countries, have given rise to voice applications with a capability for user-generated content. These permit a user to phone into a number and access voice application sites analogous to websites, yet controlled, delivered and administered via audio and voice. While this has proven a boon in those instances where a computer or enhanced mobile phone, let alone internet access, is not available to a user, limitations indeed are present. Thus for all of the advantages of automatic speech recognition (ASR) that might be used in voice applications, a degree of versatility and workability is still sacrificed.

BRIEF SUMMARY

In summary, one aspect of the invention provides a method comprising: accessing a voice application; selecting a voice application template which supports a voice input mode; selecting at least one voice application template which supports at least one input mode other than voice and telephone touch tone; and according a capability to selectively access the voice application via the voice input mode and the at least one input mode other than voice and telephone touch tone.

Another aspect of the invention provides an apparatus comprising: at least one processor; and a computer readable storage medium having computer readable program code embodied therewith and executable by the at least one processor, the computer readable program code comprising: computer readable program code configured to access a voice application; computer readable program code configured to select a voice application template which supports a voice input mode; computer readable program code configured to select at least one voice application template which supports at least one input mode other than voice and telephone touch tone; and computer readable program code configured to accord a capability to selectively access the voice application via the voice input mode and the at least one input mode other than voice and telephone touch tone.

An additional aspect of the invention provides a computer program product comprising: a computer readable storage medium having computer readable program code embodied therewith, the computer readable program code comprising: computer readable program code configured to access a voice application; computer readable program code configured to select a voice application template which supports a voice input mode; computer readable program code configured to select at least one voice application template which supports at least one input mode other than voice and telephone touch tone; and computer readable program code configured to accord a capability to selectively access the voice application via the voice input mode and the at least one input mode other than voice and telephone touch tone.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
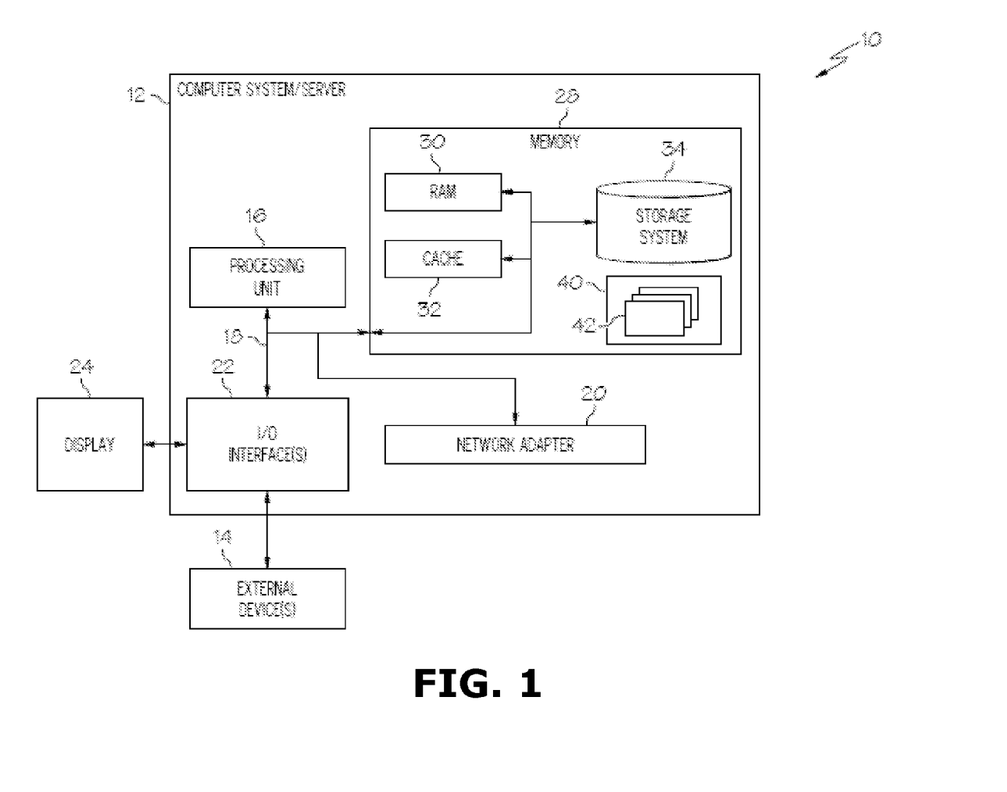
FIG. 1 illustrates a computer system.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, at least one processor processing unit 16, a system memory 28, and a bus 18 that couples various system components including system memory 28 to processor 16.

Bus 18 represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, at least one application program, other program modules, and program data. Each of the operating system, at least one application program, other program modules, and program data or some combination thereof, may include an implementation of a networking environment. Program modules 42 generally carry out the functions and/or methodologies of embodiments of the invention as described herein.

Computer system/server 12 may also communicate with at least one external device 14 such as a keyboard, a pointing device, a display 24, etc.; at least one device that enable a user to interact with computer system/server 12; and/or any devices (e.g., network card, modem, etc.) that enable computer system/server 12 to communicate with at least one other computing device. Such communication can occur via I/O interfaces 22. Still yet, computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
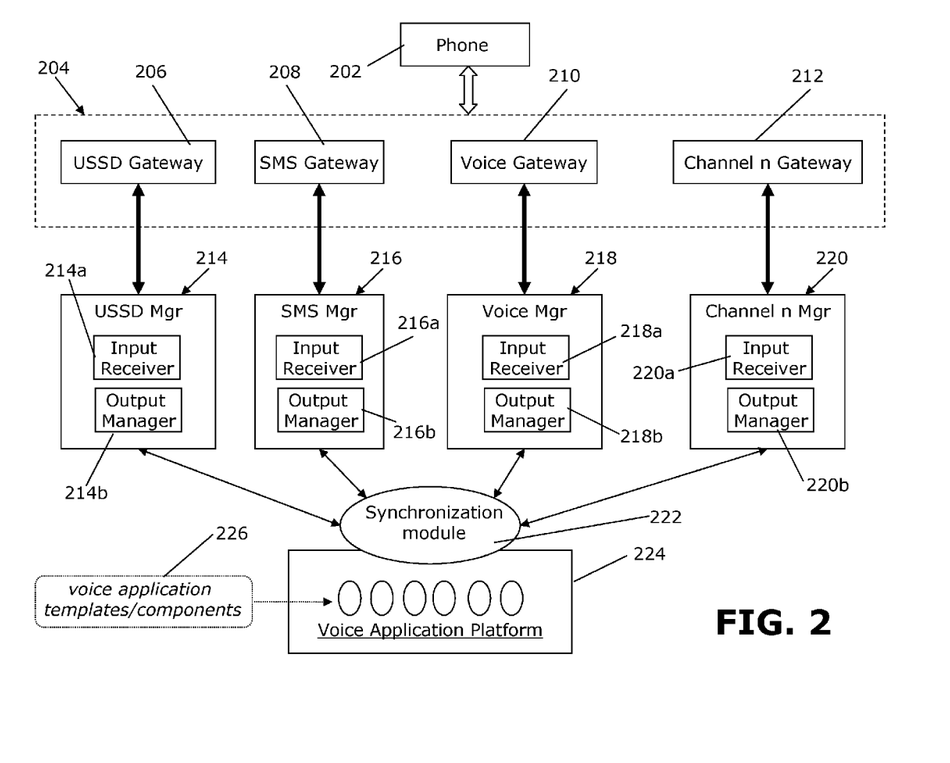
FIG. 2 schematically illustrates components of a voice application and interaction of a phone therewith.

The disclosure now turns to FIG. 2. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12 in FIG. 1. In accordance with an example embodiment, most if not all of the process steps, components and outputs discussed with respect to FIG. 2 can be performed or utilized by way of a processing unit or units and system memory such as those indicated, respectively, at 16 and 28 in FIG. 1, whether on a server computer, a client computer, a node computer in a distributed network, or any combination thereof.

Generally, the creation of audio content continues to evolve for use in new applications. One such application is the World Wide Telecom Web (WWTW), also referred to as the 'Telecom Web' or the 'Spoken Web.' The Spoken Web is a network of VoiceSites hosted on the telecom network, wherein each voice site individually comprises a voice driven application. The Spoken Web system may be viewed as a telecom network parallel to the World Wide Web (WWW) that runs on the Internet infrastructure. VoiceSites are accessed by calling the number associated with the VoiceSite, called a VoiNumber. A VoiLink is used to link the various VoiceSites to one another. A VoiceSite may be created or updated through a voice driven interface, such that a program creator may create a VoiceSite or modify an existing VoiceSite using a cellular phone. The Spoken Web is an ideal solution for a large part of the world where the population does not have access to the devices necessary to access the Internet, but cellular phone penetration is high. As a result, the use of the Spoken Web and the number of VoiceSites continue to increase. Thus, the volume of audio content associated with the Spoken Web continues to steadily expand.

Generally, the World Wide Telecom Web and interconnected voice applications (VoiceSites) and can be accessed by any voice-capable (e.g., landline or cellular) telephone. In the course of an ordinary phone call, the user interacts with a service or other application through speech or DTMF (dual tone multi frequency, or the signal to the phone company that is generated when one presses the touch keys of a telephone, which can also be referred to as "touch tone" or "telephone touch tone").

By way of further background in accordance with at least one embodiment of the invention, SWAF (Spoken Web Application Framework) can be used in creating VoiceSites. Background information on SWAF may be found in A. Kumar et al., "The Spoken Web Application Framework User Generated Content and Service Creation through low-end mobiles" in 7th International Cross-Disciplinary Conference on Web Accessibility (W4A; collocated with World Wide Web Conference, 2010).

In accordance with at least one embodiment of the invention, in a voice application with a capability for user generated content (such as VoiceSites), there is broadly contemplated herein a capability for employing multiple input media. More particularly, in accordance with at least one embodiment of the invention, there are broadly contemplated herein methods and arrangements for according a greater range of input capabilities than are possible in conventional voice-based applications with a capability for user-generated content. Embodiments of the invention embrace a recognition of advantages associated with providing input to voice applications not only via voice itself, but via texts (e.g., via SMS [short message service] and/or USSD [unstructured supplementary services data]) and graphical user interfaces (GUI). Such GUI's could be relatively simple in appearance and functioning, or could be relatively sophisticated as found in some smart phones today.

Generally, IVR (interactive voice response) applications enable content input to a voice application by relying solely on ASR and/or DTMF (dual-tone multi-frequency signaling, e.g., as may be employed by pressing keys on a phone keypad). ASR, for its part, tends not to be widely available for languages other than English, while even in the case of English (and certainly other languages) the performance of ASR on long sentences or multiple words is either not available or prone to recognition errors. Further, ASR bears a restriction of working on restricted grammars and not on free text.

In accordance with at least one embodiment of the invention, a capability for additional forms of input (e.g., via USSD or SMS) permits the building of enriched and enhanced IVR applications. Such additional forms of input can allow a user to provide content or responses to menu prompts and/or navigational questions that can be provided, e.g., via a text or a simple GUI arrangement. In particular, the textual or graphical representation of voice menus over a mobile phone can help the user to perform tasks such as capturing menu content as well as editing or restructuring the user-generated voice application site.

FIG. 2 schematically illustrates components of a voice application and interaction of a phone therewith, in accordance with at least one embodiment of the invention. As shown, a phone 202 of a user is selectively accessible to a set of input media 204 which include, but by no means are necessarily limited to: a USSD gateway 206, an SMS gateway 208, a voice (voice-based) gateway 210 and a "channel n" gateway 212, or a gateway where at least one GPRS (general packet radio service) channel can be employed.

In accordance with at least one embodiment of the invention, each gateway 204/206/208/210 is in communication with a corresponding voice application manager, indicated at 212/214/216/218. As shown, then, USSD manager 212 includes an input receiver 212a and an output manager 212b. Input receiver 212a receives USSD input from phone 202 and transmits user-generated or initiated data to a synchronization module 222 associated with a voice application platform 224. Input receiver 212a can receive text or encoded text from phone 202, as such, and even could receive input via a simple GUI at phone 202. Output manager 212b, on the other hand, receives voice application output from platform 224 (via synchronization module 222) and transmits the same back to phone 202 in the same form as originally received from phone 202. It is also conceivable to input data in one form to the voice application and then output it back in another form.

Likewise, in accordance with at least one embodiment of the invention, SMS manager 214 includes an input receiver 214a and an output manager 214b wherein input receiver 214a receives USSD input from phone 202 and transmits user-generated or initiated data to synchronization module 222. Input receiver 214a can receive text or encoded text from phone 202, as such, and even could receive input via a simple GUI at phone 202. Output manager 214b, on the other hand, receives voice application output from platform 224 (via synchronization module 222) and transmits the same back to phone 202 in the same form as originally received from phone 202. Again, it is also conceivable to input data in one form to the voice application and then output it back in another form.

In accordance with at least one embodiment of the invention, voice manager 216 includes an input receiver 216a, wherein voice or DTMF input is accepted over a phone call (from phone 202) and then passed to synchronization module 222. Via output manager 216b, voice application output is received from platform 224 (via synchronization module 222) and is transmitted back to phone 202 in the same form as originally received from phone 202. (Again, it is also conceivable to input data in one form to the voice application and then output it back in another form.)

In accordance with at least one embodiment of the invention, channel n manager 218 includes an input receiver 218a and an output manager 218b wherein text or encoded text is received from phone 202 and then passed to synchronization module 222.

For its part, in accordance with at least one embodiment of the invention, synchronization module 222 acts to synchronize inputs from all of the managers 212/214/216/218 and stores and manages data relating to a current session state. For example, such data may include a triple of <user, input channel manager, voice application site>. Via the voice application platform 224 (e.g., Spoken Web as discussed further above), voice application templates and components 226 are availed to the user by way of constructing or modifying a voice application site (such as a VoiceSite). In accordance with at least one embodiment of the invention, synchronization module 222 is an integral part of a voice application site, as is the case with VoiceSites. As such, each site has its own manager which is responsible for synchronizing inputs to, and forwarding the same to, the voice application.

Generally, in accordance with at least one embodiment of the invention, multiple input channels to voice applications are accorded (e.g., via gateways 206/208/210/212 as shown and described), wherein the input channels provide content input and/or control input. Content input can be defined as including any input that contributes in the form of application data. For instance, data input by a caller, when prompted by the voice application, can constitute content input. Control input can be defined as including directives that help a caller control the interaction, flow, or navigation of a voice application site, but do not include "content" or "content input" as just described.

In accordance with at least one embodiment of the invention, managers 214/216/218/220 can include, in addition to an input receiver (214a/216a/218a/220a) and output manager (214b/216b/218b/220b), a connection establishment module, synchronization module, session manager, a communication close module and communication channel clients. Of the five latter components, in voice application sites (such as VoiceSites), a session manager can be employed to manage a voice application session while the others can be employed to support multimodal channels. Further, while the main synchronization module acts to synchronize inputs from multiple channels (e.g., SMS, USSD, etc.), the internal synchronization module at each manager can be used to properly collect input coming in on a specific channel properly before forwarding it to the main synchronization module 222.

In an example embodiment of the invention, the following steps can also be undertaken by a user:
  selecting a predefined VoiceSite template that supports other modes of input/output apart from voice;
  during a VoiceSite creation phase, selecting and configuring the components that need to provide multimodal support; and
  using a meta-VoiceSite and a library of pre-built components, generating a deployable version of the desired VoiceSite.

Figure 3:
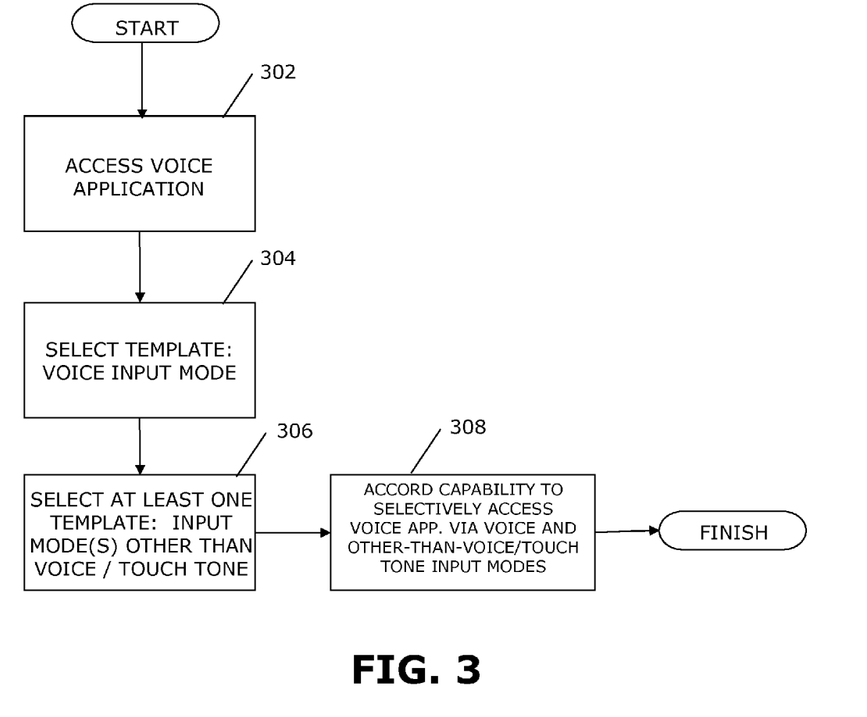
FIG. 3 sets forth a process more generally for according multiple input media to a voice-based application.

FIG. 3 sets forth a process more generally for according multiple input media to a voice-based application, in accordance with at least one embodiment of the invention. It should be appreciated that a process such as that broadly illustrated in FIG. 3 can be carried out on essentially any suitable computer system or set of computer systems, which may, by way of an illustrative and on-restrictive example, include a system such as that indicated at 12 in FIG. 1. In accordance with an example embodiment, most if not all of the process steps discussed with respect to FIG. 3 can be performed by way a processing unit or units and system memory such as those indicated, respectively, at 16 and 28 in FIG. 1.

As shown in FIG. 3, a voice application is accessed (302) and a voice application template which supports a voice input mode is selected (304). At least one voice application template which supports at least one input mode other than voice and telephone touch tone is also selected (306), and a capability is accorded to selectively access the voice application via the voice input mode and the at least one input mode other than voice and telephone touch tone (308).

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium(s) having computer readable program code embodied thereon.

Any combination of at least one computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   initiating a communication session between a telecommunications user and a voice application site hosted at a server of a telecommunications network, wherein the telecommunications user comprises a user of a voice-capable telephone and wherein the voice application site comprises a voice driven application running on telecommunications infrastructure and accessible using a non-Internet access point;
   accepting, at the voice application site, content input comprising at least one input type other than voice input, wherein the at least one input type other than voice input is selected from the group consisting of: text message using short message service communications, mobile communication using unstructured supplementary service data communications, and mobile communication using general packet radio service communications;
   the voice application site being associated with a synchronization module connecting a plurality of input channels, wherein each of the plurality of input channels is of a type selected from the group consisting of: a voice input channel associated with accepted voice inputs, a text messaging input channel associated with accepted text messages, and a mobile communication input channel associated with accepted mobile communications;
   wherein the plurality of input channels connect to a plurality of voice managers, wherein each of the plurality of voice managers corresponds to one of the types of input channels and wherein each of the plurality of voice managers transmits the accepted input to the voice application site through the synchronization module by converting the accepted input to an input type readable by the voice application site;
   wherein the synchronization module synchronizes the plurality of inputs received through the plurality of voice managers and stores and manages data relating to the communication session and provides the synchronized input to the voice application site; and
   communicating information from the voice application site back to the telecommunications user in an output type that is the same as the accepted input type using the synchronization module, wherein the synchronization module receives output from the voice application site and transmits the output to the telecommunications user through the voice manager corresponding to the channel having the same type of channel as the input channel.

2. The method according to claim 1, wherein the initiating comprises accessing the voice application site through voice interface over a phone call.

3. The method according to claim 1, wherein the text messaging input channel comprises a Short Message Service input channel.

4. The method according to claim 3, wherein the Short Message Service input channel includes at least one taken from the group consisting of: text input and graphical user interface input.

5. The method according to claim 1, wherein the mobile communication channel comprises an Unstructured Supplementary Service Data input channel.

6. The method according to claim 5, wherein the Unstructured Supplementary Service Data input channel includes at least one taken from the group consisting of: text input and graphical user interface input.

7. The method according to claim 1, wherein the mobile communication channel comprises a General Packet Radio Service input channel.

8. The method according to claim 7, wherein the General Packet Radio Service input includes text input.

9. The method according to claim 1, wherein the voice manager corresponding to the channel having the same type of channel as the input channel comprises a receiver which accepts at least one input taken from the group consisting of: control input and content input.

10. The method according to claim 1, wherein the voice manager corresponding to the channel having the same type of channel as the input channel comprises an output manager which communicates with the voice application site.

11. An apparatus comprising:
    at least one processor; and
    a computer readable storage medium having computer readable program code embodied therewith and executable by the at least one processor, the computer readable program code comprising:
    computer readable program code configured to initiate a communication session between a telecommunication user and a voice application site hosted at a server of a telecommunications network, wherein the telecommunications user comprises a user of a voice-capable telephone and wherein the voice application site comprises a voice driven application running on telecommunications infrastructure and accessible using a non-Internet access point;

computer readable program code configured to accept, at the voice application site, content input comprising at least one input type other than voice input, wherein the at least one input type other than voice input is selected from the group consisting of: text message using short message service communications, mobile communication using unstructured supplementary service data communications, and mobile communication using general packet radio service communications;

the voice application site being associated with a synchronization module connecting a plurality of input channels, wherein each of the plurality of input channels is of a type selected from the group consisting of: a voice input channel associated with accepted voice inputs, a text messaging input channel associated with accepted text messages, and a mobile communication input channel associated with accepted mobile communications;

wherein the plurality of input channels connect to a plurality of voice managers, wherein each of the plurality of voice managers corresponds to one of the types of input channels and wherein each of the plurality of voice managers transmits the accepted input to the voice application site through the synchronization module by converting the accepted input to an input type readable by the voice application site;

wherein the synchronization module synchronizes the plurality of inputs received through the plurality of voice managers and stores and manages data relating to the communication session and provides the synchronized input to the voice application site; and computer readable program code configured to communicate information from the voice application site back to the telecommunications user in an output type that is the same as the accepted input type using the synchronization module, wherein the synchronization module receives output from the voice application site and transmits the output to the telecommunications user through the voice manager corresponding to the channel having the same type of channel as the input channel.

12. A computer program product comprising:

at least one processor; and a computer readable storage medium having computer readable program code embodied therewith and executable by the at least one processor, the computer readable program code comprising:

computer readable program code configured to initiate a communication session between a telecommunication user and a voice application site hosted at a server of a telecommunications network, wherein the telecommunications user comprises a user of a voice-capable telephone and wherein the voice application site comprises a voice driven application running on telecommunications infrastructure and accessible using a non-Internet access point;

computer readable program code configured to initiate a communication session between a telecommunication user and a voice application site hosted at a server of a telecommunications network, wherein the telecommunications user comprises a user of a voice-capable telephone and wherein the voice application site comprises a voice driven application running on telecommunications infrastructure and accessible using a non-Internet access point;

computer readable program code configured to accept, at the voice application site, content input comprising at least one input type other than voice input, wherein the at least one input type other than voice input is selected from the group consisting of: text message using short message service communications, mobile communication using unstructured supplementary service data communications, and mobile communication using general packet radio service communications;

the voice application site being associated with a synchronization module connecting a plurality of input channels, wherein each of the plurality of input channels is of a type selected from the group consisting of: a voice input channel associated with accepted voice inputs, a text messaging input channel associated with accepted text messages, and a mobile communication input channel associated with accepted mobile communications;

wherein the plurality of input channels connect to a plurality of voice managers, wherein each of the plurality of voice managers corresponds to one of the types of input channels and wherein each of the plurality of voice managers transmits the accepted input to the voice application site through the synchronization module by converting the accepted input to an input type readable by the voice application site;

wherein the synchronization module synchronizes the plurality of inputs received through the plurality of voice managers and stores and manages data relating to the communication session and provides the synchronized input to the voice application site; and computer readable program code configured to communicate information from the voice application site back to the telecommunications user in an output type that is the same as the accepted input type using the synchronization module, wherein the synchronization module receives output from the voice application site and transmits the output to the telecommunications user through the voice manager corresponding to the channel having the same type of channel as the input channel.

13. The computer program product according to claim 12, wherein the computer readable program code is configured to initiate the accessing of the voice application site through voice interface over a phone call.

14. The computer program product according to claim 12, wherein the text messaging input channel comprises Short Message Service input channel.

15. The computer program product according to claim 14, wherein the Short Message Service input channel includes at least one taken from the group consisting of: text input and graphical user interface input.

16. The computer program product according to claim 12, wherein the mobile communication channel comprises. Unstructured Supplementary Service Data input channel.

17. The computer program product according to claim 16, wherein the Unstructured Supplementary Service Data input channel includes at least one taken from the group consisting of: text input and graphical user interface input.

18. The computer program product according to claim 12, wherein the mobile communication channel comprises General Packet Radio Service input channel.

19. The computer program product according to claim 18, wherein the General Packet Radio Service input includes text input.

20. The method according to claim 1, wherein each of the plurality of voice managers communicates with a gateway that corresponds to one of the types of input channels.

* * * * *